United States Patent
Schuster et al.

(10) Patent No.: US 11,999,472 B2
(45) Date of Patent: Jun. 4, 2024

(54) ROTOR BLADE NON-COUNTERBORED RETENTION ASSEMBLY VIA A SLIDING CLAMPED BUSHING

(71) Applicant: Lockheed Martin Corporation, Bethesda, MD (US)

(72) Inventors: Daniel George Schuster, Bethlehem, CT (US); Evan S. Tobin, Sandy Hook, CT (US); David N. Schmaling, Southbury, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 261 days.

(21) Appl. No.: 17/518,370

(22) Filed: Nov. 3, 2021

(65) Prior Publication Data

US 2023/0136833 A1  May 4, 2023

(51) Int. Cl.
*B64C 27/48* (2006.01)
*B64C 27/10* (2023.01)
*B64C 27/35* (2006.01)
*B64C 27/26* (2006.01)
*B64C 27/82* (2006.01)

(52) U.S. Cl.
CPC .............. *B64C 27/48* (2013.01); *B64C 27/10* (2013.01); *B64C 27/35* (2013.01); *B64C 27/26* (2013.01); *B64C 2027/8236* (2013.01); *B64C 2027/8272* (2013.01); *B64C 2027/8281* (2013.01)

(58) Field of Classification Search
CPC ...................................................... B64C 27/48
See application file for complete search history.

(56) References Cited

U.S. PATENT DOCUMENTS

| | | | |
|---|---|---|---|
| 4,012,169 A | 3/1977 | Mouille et al. | |
| 4,690,615 A | 9/1987 | Kuntze-Fechner et al. | |
| 4,828,458 A | 5/1989 | Pariani | |
| 8,662,847 B2* | 3/2014 | Kuntze-Fechner | B64C 27/33 416/134 A |
| 10,247,218 B2 | 4/2019 | Kirchen et al. | |
| 10,329,008 B2* | 6/2019 | Walker | B64F 5/10 |
| 10,604,246 B2 | 3/2020 | Baskin et al. | |
| 11,292,587 B2* | 4/2022 | Cabrera | B64C 27/48 |
| 2020/0385107 A1 | 12/2020 | Bowles et al. | |

* cited by examiner

*Primary Examiner* — Justin D Seabe
*Assistant Examiner* — John S Hunter, Jr.
(74) *Attorney, Agent, or Firm* — Foley & Lardner LLP

(57) ABSTRACT

A rotor blade retention assembly includes a central hub, a rotor blade including an upper outer surface, a lower outer surface, a blade hole, and a proximal end coupled to the central hub, a strap member extending along a portion of the rotor blade such that a distal end receiving portion extends into the blade hole, and a retainer assembly disposed within the blade hole and coupled to the strap member. The retainer assembly includes an upper bushing and a lower bushing slidably disposed within the blade hole. The upper bushing includes a counterbored portion. The retainer assembly also includes an outboard blade pin disposed within the distal end receiving portion and includes a blade pin inner cavity.

20 Claims, 9 Drawing Sheets

ROTOR BLADE NON-COUNTERBORED RETENTION ASSEMBLY VIA A SLIDING CLAMPED BUSHING

STATEMENT REGARDING FEDERALLY SPONSORED RESEARCH OR DEVELOPMENT

This invention was made with Government support under Agreement No. W911W6-19-9-0005, awarded by the Army Contracting Command-Redstone Arsenal. The Government has certain rights in the invention.

FIELD

The present application relates generally to rotor blade retention assemblies for a rotary propulsor system.

BACKGROUND

Rotary propulsor systems include rear-facing rotor blades disposed at the tail of an airframe and generally assist with the generation of forward thrust, although rotary propulsor systems may also generate lift and provide for additional yaw control. The rotor blades may be formed from composite material and have a retention joint including a strap that helps secures the blade to a central hub.

SUMMARY

In a system such as that described above, the retention joint may include one or several retention pins to secure the retention joint to the strap, which may be a tension-torsion strap. In this configuration, there is an interface between the tension-torsion strap and an inner surface of the rotor blade, which is highly critical to the operation of the rotor blade. The rotor blade may have a counterbored hole which experiences high shear stresses and tight tolerance dimensions are generally needed to maintain a clearance at the interface.

Rotor blade configurations of rotary propulsor systems as described above may result in rotor blade failure. Because of the small radius of the counterbored hole in the rotor blade, the counterbored hole creates an area of very high interlaminar shear stress, friction, and bending retention. As a result of the high stresses and loads at this location, the composite rotor blade layers are susceptible to delamination. The high stresses at this location may also lead to failure of the tension-torsion strap. Further, high stresses at the counterbored hole make it difficult to maintain the small gaps and tight tolerance dimensions at the interface. Shims with peelable layers may be used to maintain the tight tolerance dimensions, but the shims may need to be replaced during each installation. A bolt may be used to clamp down the retention joint to maintain the tight tolerance dimensions, but using the bolt to maintain the gap and the tight tolerance dimensions may compress the blade, leading to failure of the retention joint pin. Additionally, multiple retention joint pins may be required to secure the retention joint, which increases the time needed for installing or removing the retention joint. The present disclosure addresses these and other issues.

Various embodiments provide for a rotor blade retention assembly without a counterbored hole in the rotor blade. In one embodiment, the rotor blade retention assembly includes a central hub and at least one rotor blade. The rotor blade includes an upper outer surface, a lower outer surface, a blade hole, and a proximal end coupled to the central hub. The rotor blade retention assembly also includes a strap member extending along a portion of the rotor blade such that a distal end receiving portion extends into the blade hole. A retainer assembly is disposed within the blade hole and coupled to the strap member. The retainer assembly includes an upper bushing and a lower bushing slidably disposed within the blade hole The upper bushing includes an upper counterbored portion. Further, the upper bushing and the lower bushing cooperate to form a bushing inner cavity. An outboard blade pin is disposed within the bushing inner cavity and is surrounded by the distal end receiving portion of the strap member.

Various embodiments provide for a retainer assembly for use in a rotor blade retention assembly having a retainer cavity. In one embodiment, the retainer assembly includes the upper bushing and the lower bushing slidably disposed within the retainer cavity. The upper bushing includes an upper counterbored portion. The upper bushing and the lower bushing cooperate to form the bushing inner cavity. The retainer assembly also include an outboard blade pin with a blade pin inner cavity and is disposed within the bushing inner cavity.

Various other embodiments provide for a method for installing a retainer assembly of a rotor blade retention assembly. The method includes inserting the distal end receiving portion into the blade hole, inserting, after inserting the distal end receiving portion into the blade hole, the upper bushing and the lower bushing into the blade hole, and inserting, after inserting the upper bushing and the lower bushing into the blade hole, the outboard blade pin into the bushing inner cavity and through the distal end receiving portion.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
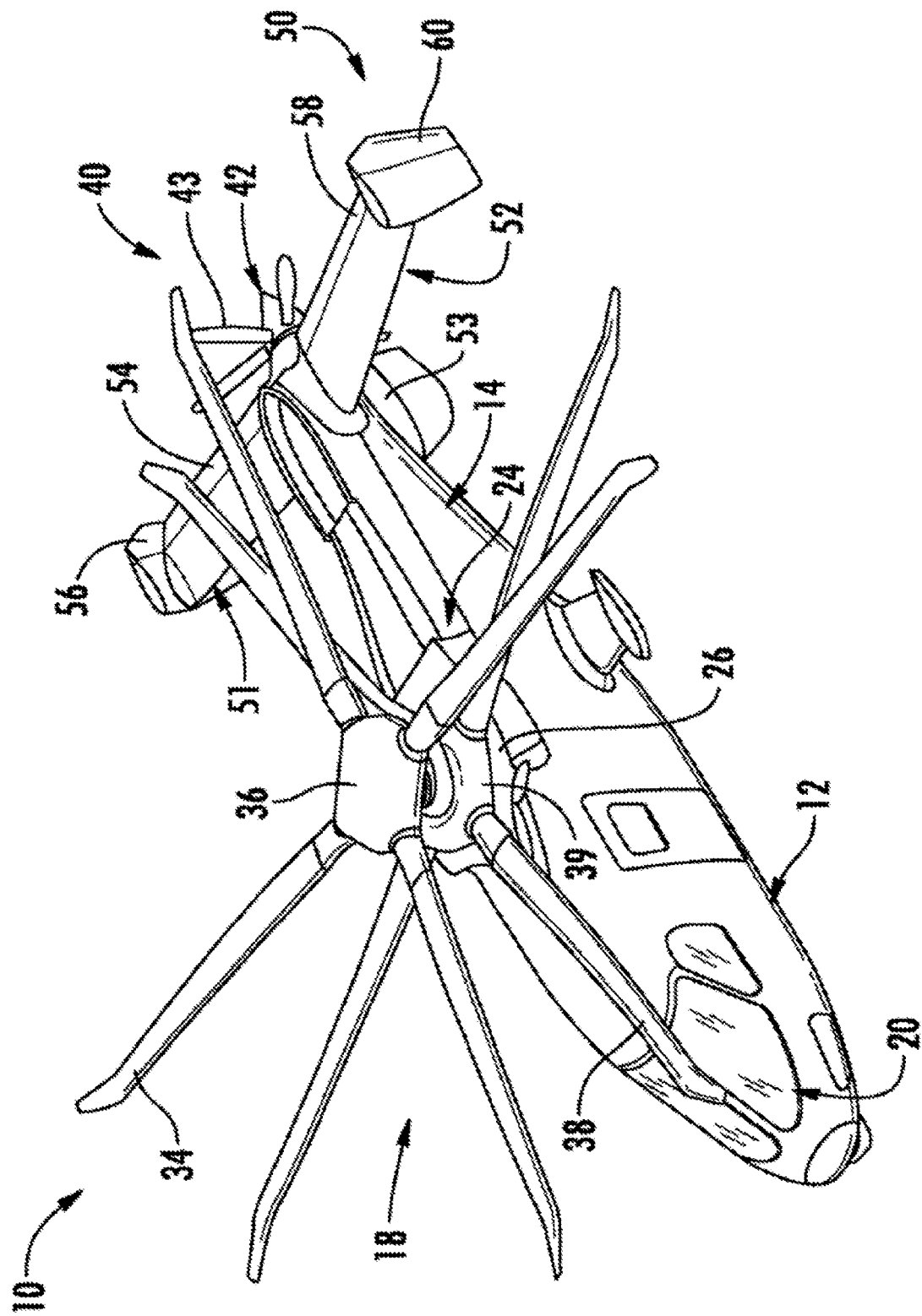
FIG. 1 is perspective view of a rotary wing aircraft in accordance with an exemplary embodiment as seen in U.S. Patent Pub. No. US 2020/0385107 A1, which is incorporated by reference herein in its entirety for the technical and background information therein.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods, apparatuses, and for providing a rotor blade retention assembly for a rotary propulsor system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

Referring to the figures generally, various embodiments disclosed herein relate to a rotor blade retention assembly for a rotary propulsor system. As explained in more detail herein, the retention assembly facilitates transfer of a load while reducing the high shear stresses and loads normally experienced by other rotor blade retention assemblies. Other configurations of rotor blade retention assemblies experience high shear stresses and loads at critical locations, which can lead to failure of the rotor blade retention assembly.

Implementations described herein are related to a rotor blade retention assembly with a central hub, a rotor blade including an upper outer surface, a lower outer surface, a blade hole, and a proximal end coupled to the central hub, a strap member (e.g., tension-torsion strap, etc.) extending along a portion of the rotor blade such that a distal end receiving portion (e.g., spool, etc.) extends into the blade hole, and a retainer assembly disposed within the blade hole and coupled to the strap member. The retainer assembly facilitates transfer of a load from the rotor blade to the central hub. The retainer assembly includes an upper bushing and a lower bushing slidably disposed within the blade. The inclusion of sliding bushings and the absence of a counterbored hole contributes to lower shear stresses and loads on the rotor blade, reducing the likelihood of delamination.

Further, because the upper bushing and lower bushing can slide within the blade hole, the upper bushing and the lower bushing are able to repeatably clamp and support the distal end receiving portion of the strap member. Therefore, the sliding upper and lower bushings eliminate the need to maintain a small gap and allow for a larger range of component tolerances. This also eliminates the need to use shims with peelable layers to maintain the tight tolerance dimensions at the internal interface between the strap member and the rotor blade. In place of the counterbored hole in the rotor blade, the upper bushing includes a counterbored portion. Because the counterbored portion is in the upper bushing rather than the rotor blade, fastening the retainer assembly does not compress the rotor blade, thereby reducing the potential for rotor blade failure. The retainer assembly also includes a single outboard blade pin disposed within the distal end receiving portion of the strap member. The outboard blade pin includes a blade pin inner cavity, which cooperates with a first fastener and a second fastener to secure the retainer assembly. The single outboard blade pin also reduces the time needed for installation and removal processes.

II. Overview of Example Rotor Blade Retention Assembly

FIG. 1 is perspective view of a rotary wing aircraft in accordance with an exemplary embodiment. FIGS. 2-9 depict an exemplary rotor blade retention assembly 100 (e.g., rotary retention system, propulsion retention system, etc.) or portions thereof.

FIG. 1 depicts an exemplary embodiment of a rotary wing, vertical takeoff and landing (VTOL) aircraft 10. Aircraft 10 includes an airframe or fuselage 12 having a plurality of surfaces (not separately labeled) with an extending tail 14. A coaxial main rotor assembly 18 is located at the fuselage 12 and rotates about a main rotor axis. In an exemplary embodiment, the fuselage 12 includes a cockpit 20 having two seats for flight crew (e.g., pilot and co-pilot) and six seats for passengers (not shown). The coaxial main rotor assembly 18 is driven by a power source, for example, one or more engines 24, via a gearbox 26. The coaxial main rotor assembly 18 includes an upper rotor assembly 28 that may be driven in a first direction (e.g., counter-clockwise) about the main rotor axis, and a lower rotor assembly 32 that may be driven in a second direction (e.g., clockwise) about the main rotor axis opposite to the first direction (i.e., counter rotating rotors).

In accordance with an exemplary embodiment, the upper rotor assembly 28 includes a first plurality of rotor blades 34 supported by a first or upper rotor hub 36. The lower rotor assembly 32 includes a second plurality of rotor blades 38 supported by a second or lower rotor hub 39. In some embodiments, the aircraft 10 may include a translational thrust system 40 having a propeller 42 located at the extending tail 14 to provide translational thrust (forward or rearward) for aircraft 10. Propeller 42 includes a plurality of blades 43.

The propeller 42 or translational thrust system 40 is connected to and driven by the engine 24 via the gearbox 26. The translational thrust system 40 may be mounted to the rear of the fuselage 12 with a translational thrust axis oriented substantially horizontal and parallel to the aircraft longitudinal axis to provide thrust for high-speed flight. The term "parallel" should be understood to include a translational thrust axis that is coincident with the longitudinal axis. The translational thrust axis corresponds to the axis of rotation of propeller 42. While shown in the context of a pusher-prop configuration, it is understood that the propeller 42 could also be a more conventional puller prop or could be variably facing so as to provide yaw control in addition to or instead of translational thrust. It should be further understood that any such system or other translational thrust systems may alternatively or additionally be utilized. Alternative translational thrust systems may include different propulsion forms, such as a jet engine.

In accordance with an aspect of an exemplary embodiment, the propeller blades 43 of the translational thrust system 40 may include a variable pitch. More specifically, the pitch of the propeller blades 43 may be altered to change the direction of thrust (e.g., forward or rearward). In accordance with another aspect of an exemplary embodiment, the extended tail 14 includes a tail section 50 including starboard horizontal stabilizers 51 and port horizontal stabilizers 52. The tail section 50 also includes a vertical stabilizer 53 that extends downward from the extending tail 14. The starboard horizontal stabilizer 51 includes a starboard active elevator 54 and a starboard active rudder 56. Similarly, the port horizontal stabilizer 52 includes a port active elevator 58 and a port active rudder 60. The starboard active elevator 54, the port active elevator 58, the starboard active rudder 56, and the port active rudder 60 act as controllable surfaces, e.g., surfaces that alter a flight path/characteristics of aircraft 10.

Figure 2:
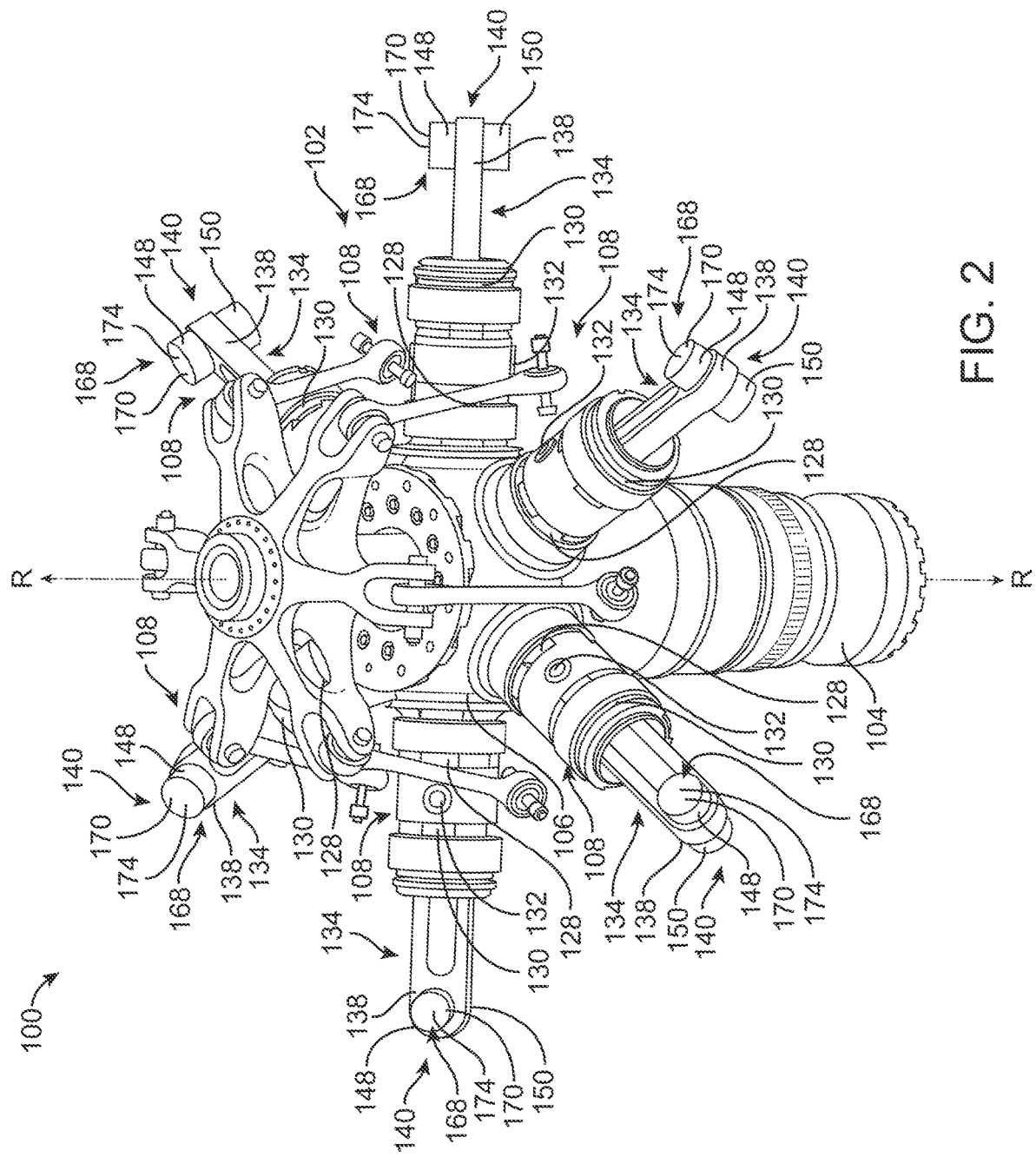
FIG. 2 is perspective view of a central hub of the retention assembly without a plurality of rotor blades in at least one exemplary embodiment.

FIG. 2 depicts a perspective view of the rotor blade retention assembly 100 included in the translational thrust system 40 and to which the propeller blades 43 of FIG. 1 are attached. The rotor blade retention assembly 100 includes a hub system 102 (e.g. hub body, rotor hub, etc.) coupled (e.g., mounted, attached, fixed, welded, fastened, riveted, bonded, pinned, etc.) to the rotary wing aircraft 10 (e.g., an airframe, an aircraft, a rotorcraft, etc.), as seen in FIG. 1. The hub system 102 includes a rotor mast 104 and a central hub 106 coupled to the rotor mast 104. The rotor mast 104 extends upwardly along and around a rotor axis R and is rotated about the rotor axis R relative to another structure to rotate the central hub 106 about the rotor axis R. The hub system 102 includes a plurality of projections 108 extending radially outward from the central hub 106 and orthogonal to the rotor axis R.

Figure 3:
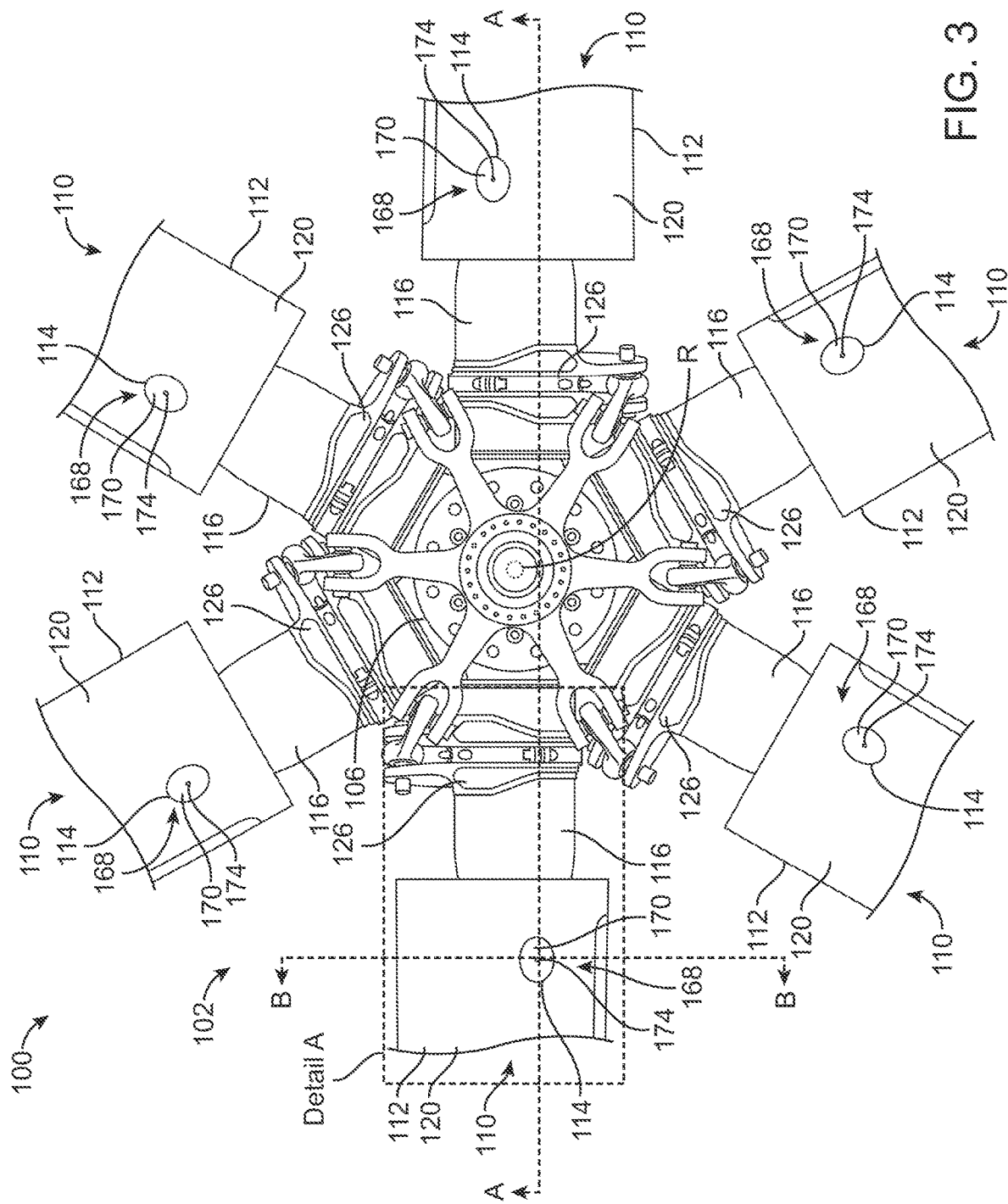
FIG. 3 is a top view of the central hub of the retention assembly show in FIG. 1 with a plurality of rotor blades installed in at least one exemplary embodiment.

FIG. 3 depicts a top view of the central hub 106 of the rotor blade retention assembly 100 show in FIG. 2. Each rotor blade retention assembly 100 includes a rotor blade 110 (e.g., blade spar, etc.), as shown as the propeller blade 43 in FIG. 1. The rotor blade 110 may be made of a layered composite structure and is coupled to the central hub 106. The rotor blade 110 extends radially outward from the central hub 106 and is orthogonal to the rotor axis R. The rotor blade 110 rotates about the rotor axis R along with the central hub 106 to produce a propulsion or lift force to move another structure.

Figure 4:
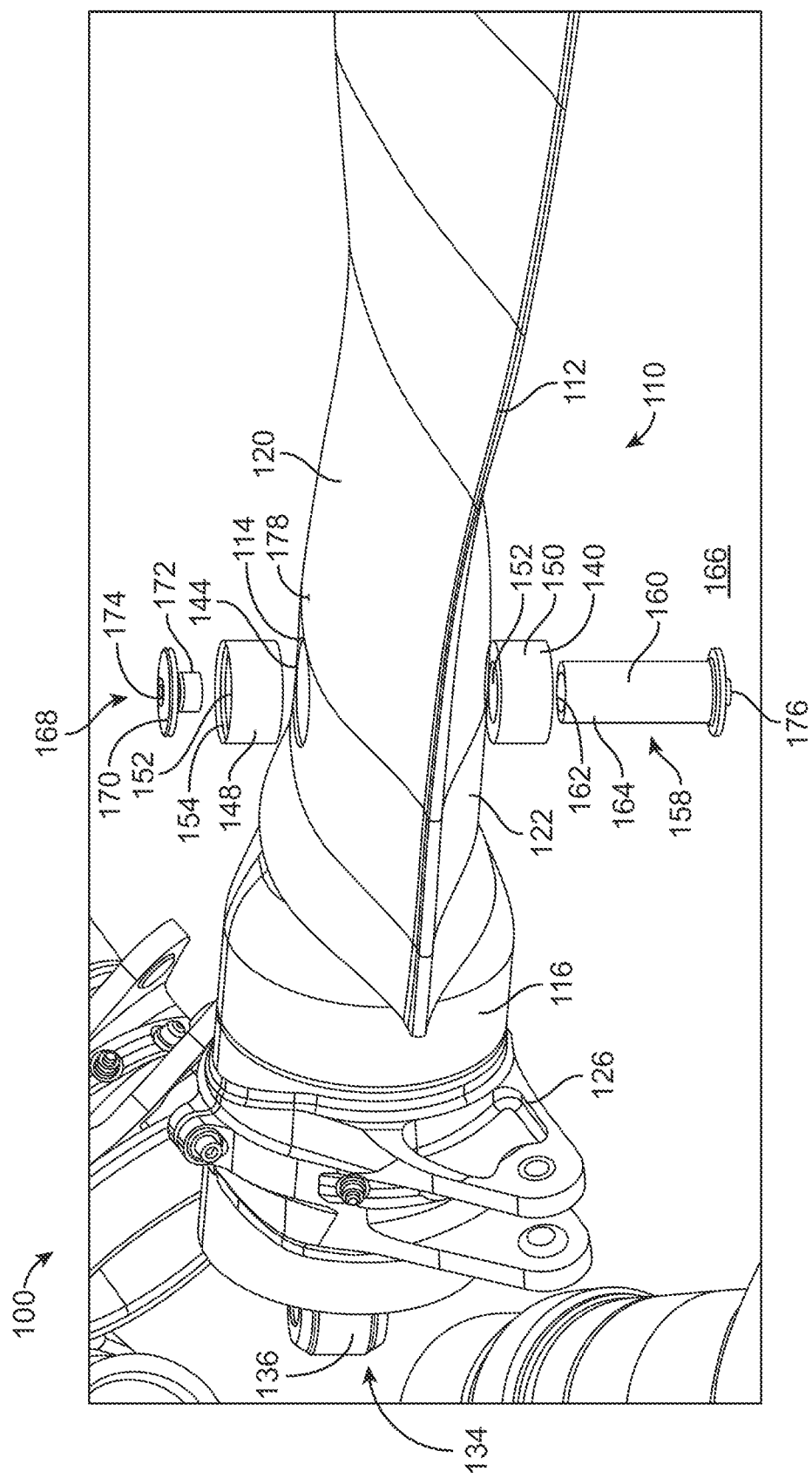
FIG. 4 is a perspective exploded view of Detail A show in FIG. 2 in at least one exemplary embodiment.
Figure 5:
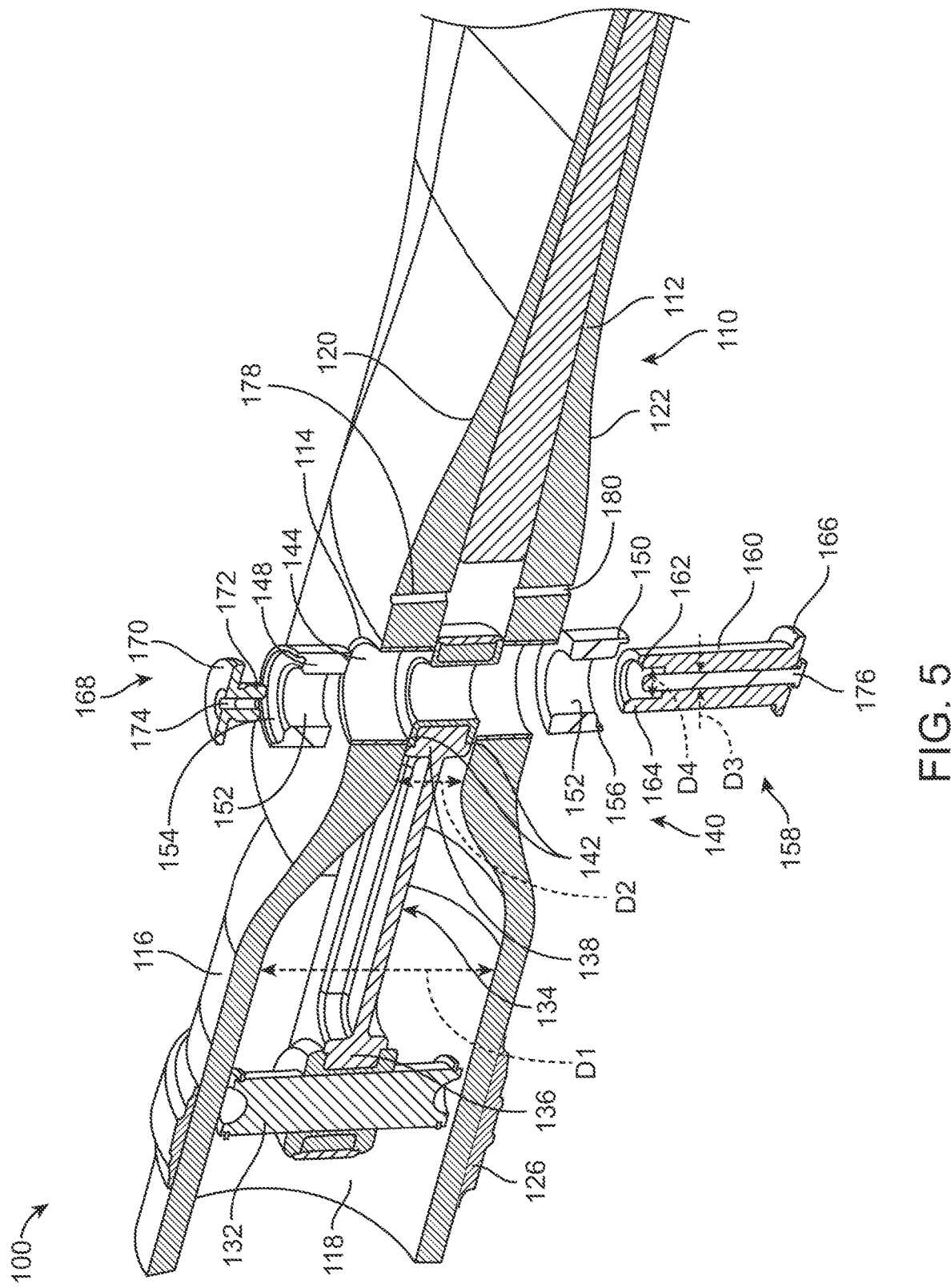
FIG. 5 is a cross-sectional exploded view of Detail A show in FIG. 2 taken along plane A-A, in at least one exemplary embodiment.
Figure 6:
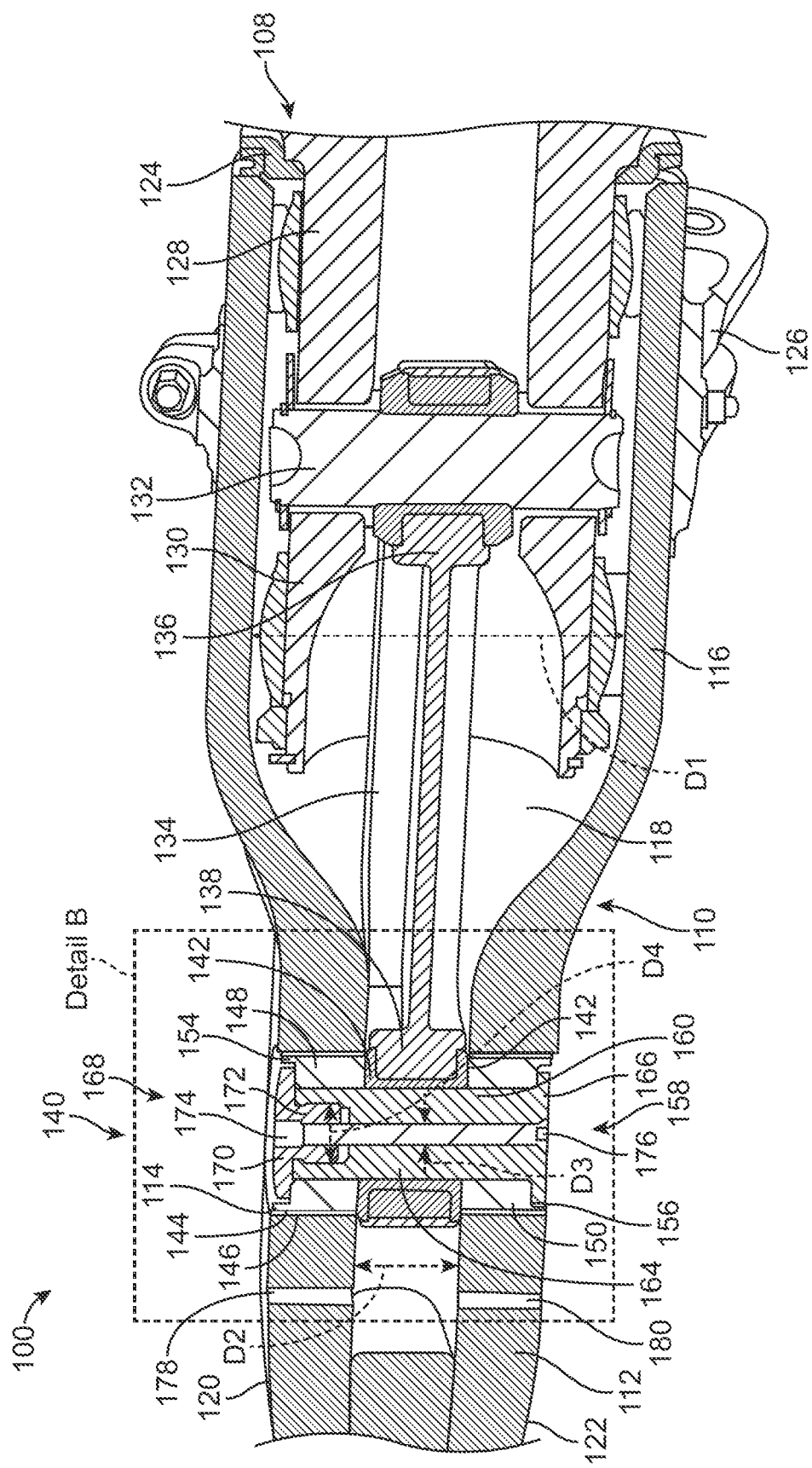
FIG. 6 is a cross-sectional view of Detail A shown in FIG. 2 taken along plane A-A, in at least one exemplary embodiment.

FIGS. 4-6 depict various views of Detail A shown in FIG. 3. For example, FIG. 4 depicts a perspective view of Detail A, FIG. 5 depicts a perspective, cross-sectional exploded view of Detail A taken along plane A-A, and FIG. 6 depicts a cross-sectional view of Detail A taken along plane A-A. As depicted in FIGS. 4-6, in some embodiments, the rotor blade 110 includes a blade body 112, a blade hole 114 in the blade body 112, a blade shaft 116 at a proximal end of the blade body 112, and a blade inner cavity 118 that extends radially outward along an interior of the blade shaft 116 and the blade body 112, as seen in FIG. 4, for example. The blade shaft 116 is configured to directly attach (e.g. couple, mount, etc.) to and extend radially outwardly from the central hub 106. The blade body 112 directly attaches to and extends radially outwardly from the blade shaft 116. The blade shaft 116 may optionally extend into the blade inner cavity 118. Optionally, the blade shaft 116 and the blade body 112 may be two separate components that are attachable (e.g., removable, reattachable, etc.) to each other. Alternatively, the blade shaft 116 and the blade body 112 may be constructed as a single unitary piece or component that cannot be separated without destruction.

At the blade shaft 116, the blade inner cavity 118 has a diameter of a distance D1. As the blade inner cavity 118 extends radially outward along the along the interior of the rotor blade 110, the diameter tapers such that the diameter reduces to a distance D2. The rotor blade 110 may be further defined by an upper outer surface 120 and a lower outer surface 122 separated by the blade inner cavity 118. In some embodiments, the rotor blade 110 also includes a blade seal 124 (e.g., seal, band, etc.). The blade seal 124 is disposed between the blade shaft 116 and the central hub 106 such as to create a seal between the blade inner cavity 118 and the environment. Each rotor blade 110 also includes a mounting bracket 126 mounted to the central hub 106 that indirectly attaches the blade shaft 116 to the central hub 106.

Referring to FIG. 6, which shows a cross-sectional view of the rotor blade retention assembly 100, in some embodiments, in each rotor blade retention assembly 100, the projection 108 of the central hub 106 extends at least partially into the blade inner cavity 118 of the blade shaft 116. The projection 108 extends into the blade inner cavity 118 where the diameter of the blade inner cavity 118 is at a distance D1. The projection 108 includes a first bearing 128 (e.g., titanium races, etc.). The first bearing 128 is coupled to the central hub 106 and cooperates with the rotor blade 110 and the central hub 106 to change the pitch angle, which changes the lift and drag. For example, by increasing the pitch angle, the rotor blade 110 provides more lift. Conversely, by decreasing the pitch angle, the rotor blade 110 provides less lift. In some embodiments, the projection 108 includes a second bearing 130 (e.g., titanium races, etc.). The second bearing 130 also cooperates with the first bearing 128, the rotor blade 110, and the central hub 106 to adjust the pitch angle. The projection 108 also includes at least one inboard blade pin 132. The inboard blade pin 132 is disposed between the first bearing 128 and the second bearing 130, and is fixedly attached to rotate with the rotor blade 110.

Figure 7:
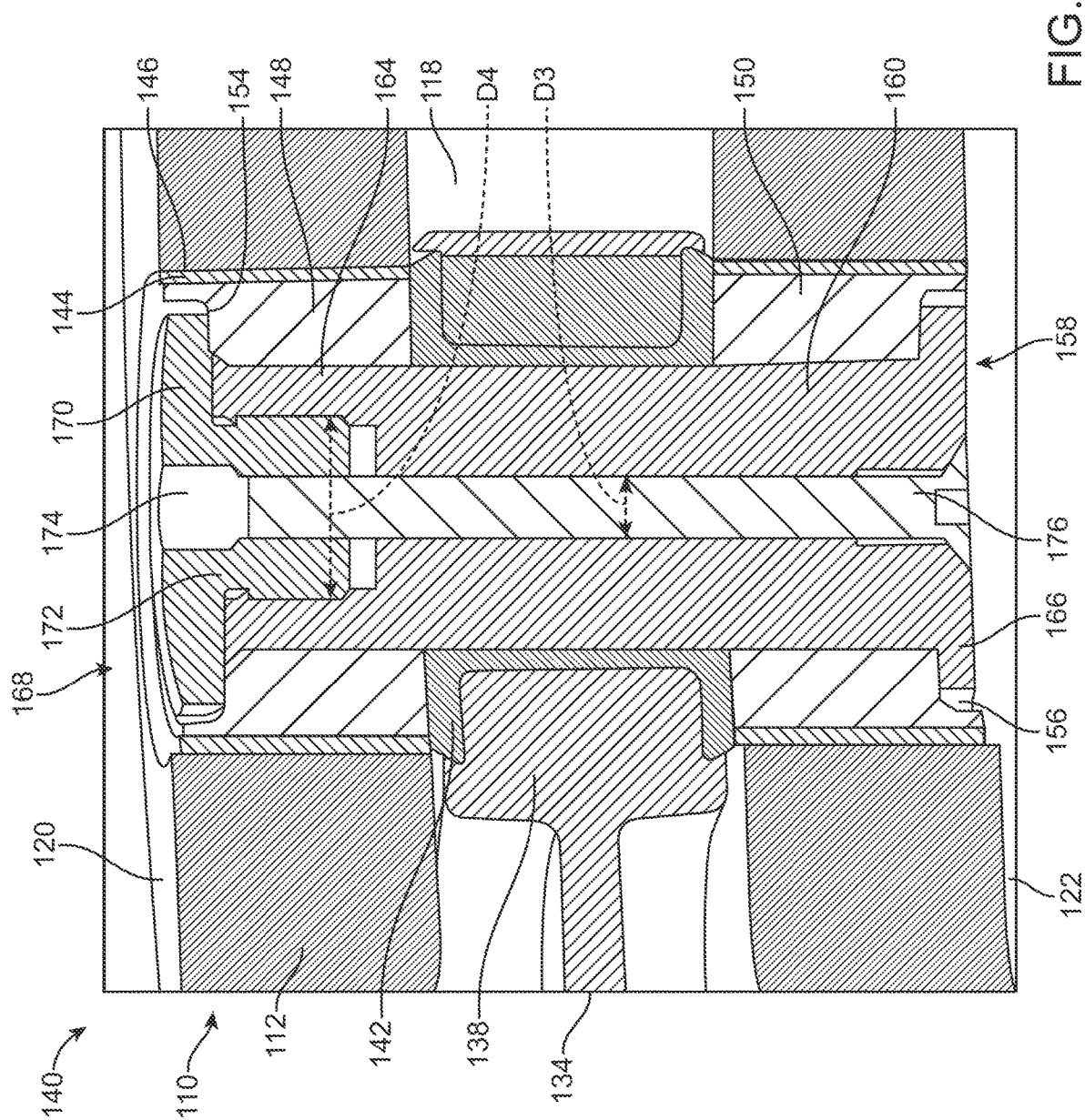
FIG. 7 is a detailed view of Detail B shown in FIG. 5, in at least one exemplary embodiment.

Referring to FIGS. 6 and 7, which show a cross-sectional view of the rotor blade retention assembly 100 and a detailed view of Detail B, respectively, in some embodiments, the rotor blade retention assembly 100 includes a strap member 134. The strap member 134 cooperates with the inboard blade pin 132 to transfer a centrifugal force from the rotor blade 110 to the central hub 106. For example, in some embodiments, the strap member 134 includes a proximal end receiving portion 136 and a distal end receiving portion 138. The proximal end receiving portion 136 is configured to receive the inboard blade pin 132 such that the proximal end receiving portion 136 surrounds the inboard blade pin 132. The strap member 134 extends radially away from the central hub 106 in the blade inner cavity 118 such that the distal end receiving portion 138 extends into a region of the blade inner cavity 118 in which the diameter is a distance D2.

Referring to FIG. 5-7, in some embodiments, the rotor blade retention assembly 100 includes a retainer assembly 140. FIG. 5 depicts an exploded view of the retainer assembly 140. FIG. 6 depicts a cross-sectional view of the retainer assembly 140, as seen in Detail B. FIG. 7 is a detailed view of the retainer assembly 140. The retainer assembly 140 is disposed within the blade hole 114 and has a cylindrical shape. The distal end receiving portion 138 extends into the blade hole 114 and is configured to receive the retainer assembly 140. The distal end receiving portion surrounds 138 a portion of the retainer assembly 140 such as to define an inner mating component surface 142. The inner mating component surface 142 cooperates with the retainer assembly 140 to reduce or eliminate a gap between the retainer assembly 140 and the inner mating component surface 142, further described below.

Figure 8:
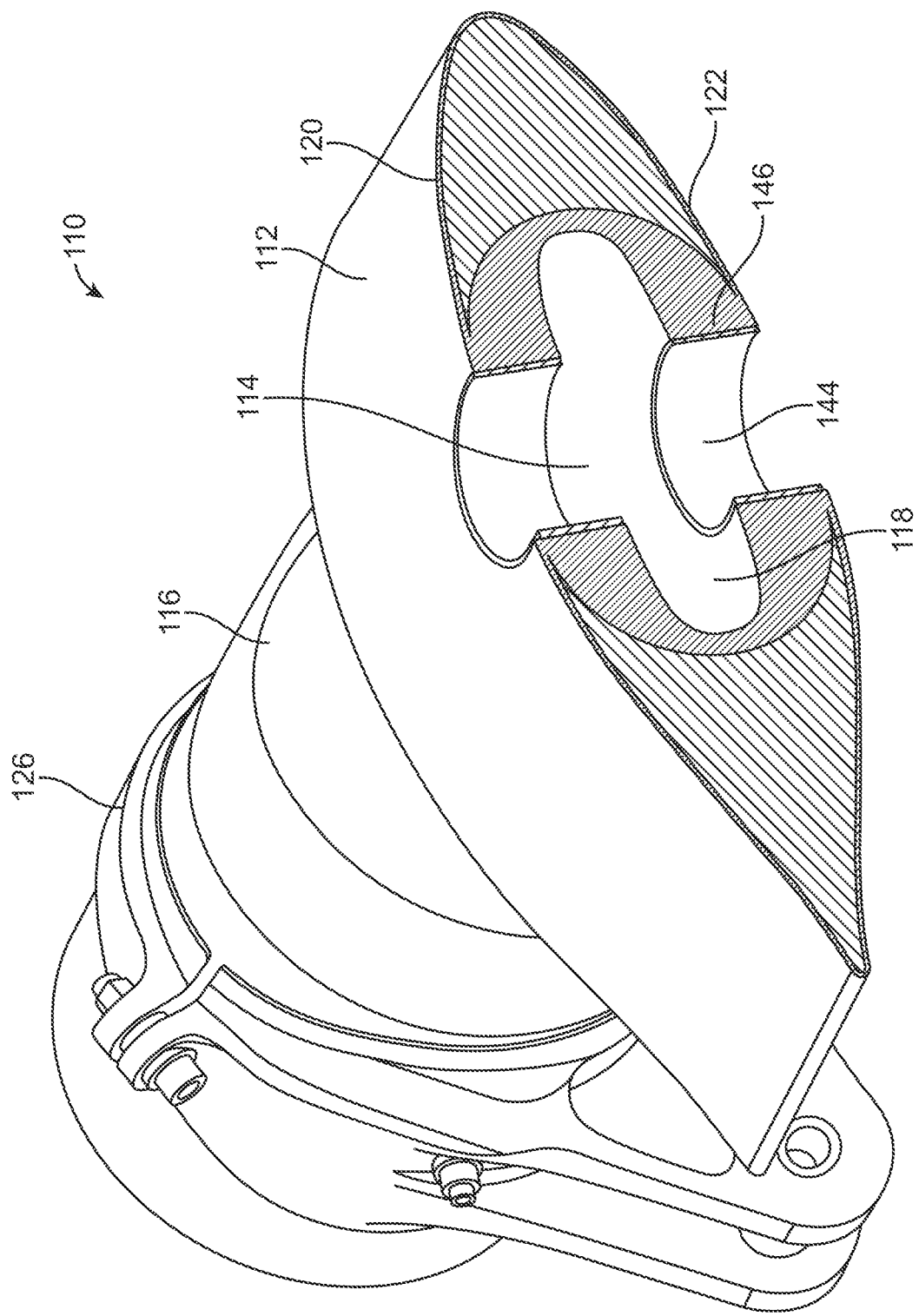
FIG. 8 is a cross-sectional view of Detail A shown in FIG. 2 taken along plane B-B, in at least one exemplary embodiment.

Referring to FIGS. 6-8, in some embodiments, the retainer assembly 140 includes a protective layer 144 (e.g. bushing, liner, etc.). FIGS. 6 and 7 depict the protective layer 144 along with other components of the retainer assembly 140, whereas FIG. 8, a cross-sectional view of Detail A taken along plane B-B, depicts the protective layer 144 without the other components of the retainer assembly 140. The protective layer 144 defines an exterior layer of the retainer assembly 140 such as to line an inner wall 146 of the blade hole 114. A first portion of the protective layer 144 extends from the distal end receiving portion 138 to the upper outer surface 120 while a second portion of the protective layer 144 extends from the distal end receiving portion 138 to the lower outer surface 122. The protective layer 144 is made of a durable material (e.g. fiberglass, etc.) and protects the blade hole 114. The retainer assembly 140 includes an upper bushing 148. The upper bushing 148 is radially inward from the protective layer 144 such that the first portion of the protective layer 144 is disposed between the inner wall 146 and the upper bushing 148. The upper bushing 148 is slidably disposed within the blade hole 114. The upper bushing 148 extends from the inner mating component surface 142 to the upper outer surface 120 of the rotor blade 110. The retainer assembly 140 also includes a lower bushing 150. The lower bushing 150 is radially inward from the protective layer 144 such that the second portion of the protective layer 144 is disposed between the inner wall 146 and the lower bushing 150. The lower bushing 150 is slidably disposed within the blade hole 114. The lower bushing 150 extends from the inner mating component surface 142 to the lower outer surface 122 of the rotor blade 110. Because the upper bushing 148 and the lower bushing 150 are slidably disposed within the blade hole 114, the upper bushing 148 and the lower bushing 150 are able to clamp the inner mating component surface 142 to allow for a larger range of component tolerances. Additionally, the sliding action of the upper bushing 148 and the lower bushing 150 enables repeatable clamp up on the inner mating component surface 142 without overstressing the retainer assembly 140 and the rotor blade 110.

In some embodiments, the upper bushing 148 and the lower bushing 150, collectively, form a bushing inner cavity 152, as seen, for example, in FIG. 5. The upper bushing 148 includes an upper counterbored portion 154. Unlike in other retainer assemblies, the upper counterbored portion 154 is in the upper bushing 148 rather than the blade body 112. Because the upper counterbored portion 154 is in the upper bushing 148, the blade body 112 does not experience high shear stresses at the blade hole 114. Similarly, the lower bushing 150 may include a lower counterbored portion 156.

Referring to FIGS. 4-7 depicting various views of the retainer assembly 140 in the rotor blade retention assembly 100, in some embodiments, the retainer assembly 140 includes an outboard blade pin 158. The outboard blade pin 158 is radially inward from the upper bushing 148 and the lower bushing 150 and is disposed within the bushing inner cavity 152. The outboard blade pin 158 includes a blade pin body portion 160. The outboard blade pin 158 is disposed within the distal end receiving portion 138 of the strap member 134 such that the distal end receiving portion 138 surrounds the blade pin body portion 160. The outboard blade pin 158 includes a blade pin inner cavity 162. The blade pin inner cavity 162 extends along the entire length of the outboard blade pin 158. In some embodiments, the portion of the blade pin inner cavity 162 that extends through the blade pin body portion 160 and has a diameter with a distance D3. The outboard blade pin 158 also includes a top portion 164. The top portion 164 is radially inward from the upper bushing 148. The portion of the blade pin inner cavity 162 that extends through the top portion 164 has a diameter with a distance D4, which is greater than the distance D3. In some embodiments, the outboard blade pin 158 includes a base portion 166. The base portion 166 is at an end opposite of the top portion 164 and extends into the lower counterbored portion 156 of the lower bushing 150 such that the base portion 166 is below a portion of the lower bushing 150.

In some embodiments, the retainer assembly 140 includes a first fastener 168. The first fastener 168 cooperates with the upper bushing 148 to clamp the inner mating component surface 142 and reduce the gap at the inner mating component surface 142. The first fastener 168 includes a cap portion 170. The cap portion 170 is disposed within the upper counterbored portion 154 such that the first fastener 168 remains below the upper outer surface 120 of the rotor blade 110. Because the cap portion 170 is disposed within the upper counterbored portion 154, the cap portion 170 is disposed above a portion of the upper bushing 148 and the outboard blade pin 158. The first fastener 168 also includes a lower portion 172. The lower portion 172 extends below the cap portion 170 such that the lower portion 172 is disposed within the blade pin inner cavity 162. Specifically, the lower portion 172 is disposed within the portion of the blade pin inner cavity 162 that extends through the top portion 164 of the outboard blade pin 158, but is not disposed within the portion of the blade pin inner cavity 162 that extends through the blade pin body portion 160. Because the lower portion 172 of the first fastener 168 is disposed within the blade pin inner cavity 162, the top portion 164 of the outboard blade pin 158 is disposed between the lower portion 172 and the upper bushing 148. The first fastener 168 further includes a fastener cavity 174. The fastener cavity 174 extends down through the cap portion 170 and the lower portion 172 such that the fastener cavity 174 and the blade pin inner cavity 162 are aligned with one another.

In some embodiments, the retainer assembly 140 includes a second fastener 176 (e.g., tension second fastener, etc.). The second fastener 176 is a threaded fastener disposed within the blade pin inner cavity 162 and extends from the lower outer surface 122 of the rotor blade 110 up into the fastener cavity 174 such that the second fastener 176 remains fixed in the lower portion 172 of the first fastener 168. As described above, the cap portion 170 is disposed above a portion of the upper bushing 148 and the outboard blade pin 158. Consequently, as the second fastener 176 is inserted into the blade pin inner cavity 162 and up into the fastener cavity 174, the second fastener 176 engages with the first fastener 168 such that the cap portion 170 compresses the upper bushing 148. Therefore, the upper bushing 148 clamps the inner mating component surface 142 and reduces the gap between the upper bushing 148 and the inner mating component surface 142. Because the gap is reduced in this way, shims with peelable layers are not needed to maintain the tight tolerance dimensions at the inner mating component surface 142.

In some embodiments, the rotor blade 110 further includes an upper blade drain hole 178 and a lower blade drain hole 180. The upper blade drain hole 178 and the lower blade drain hole 180 are located radially outward from the retainer assembly 140. The upper blade drain hole 178 extends from the blade inner cavity 118 to the upper outer surface 120. The lower blade drain hole 180 extends from the blade inner cavity 118 to the lower outer surface 122. Both the upper blade drain hole 178 and the lower blade drain hole 180 are configured to facilitate the removal of a liquid (e.g., water, condensation, etc.) from the blade inner cavity 118.

While not shown, it is understood that a cover can be installed over the blade hole 114 to cover the cap portion 170 and outboard blade pin 158 in order to continue an aerodynamic shape of the upper outer surface 120 and the lower outer surface 122.

III. Example Method of Installing the Retainer Assembly

Figure 9:
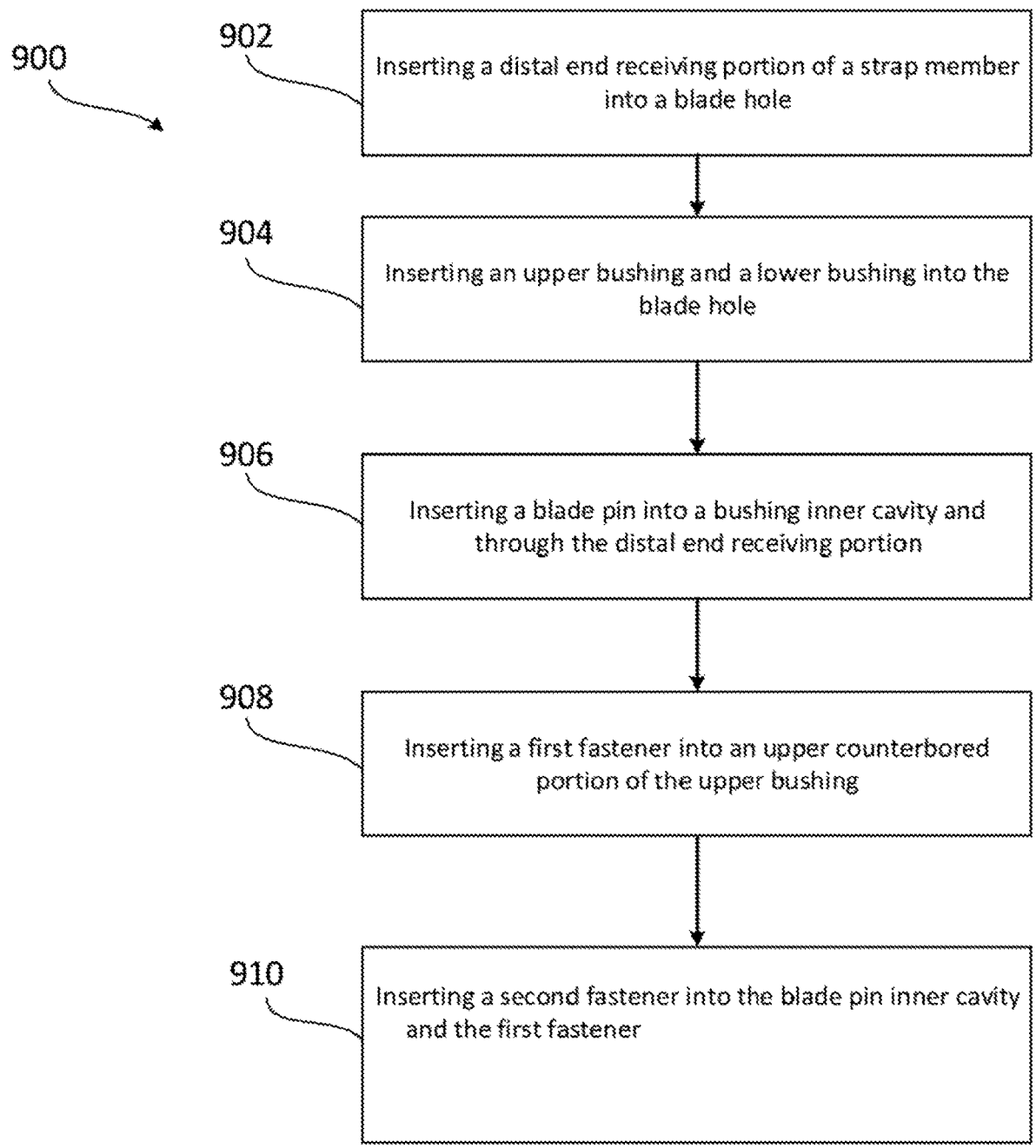
FIG. 9 is a flowchart illustrating the process for installing a retainer assembly of the rotor blade retention assembly in at least one exemplary embodiment.

FIG. 9 illustrates an installation process 900 (e.g., method, etc.) for installing the retainer assembly 140 of a rotor blade retention assembly 100.

The installation process 900 begins (step 902) by inserting the distal end receiving portion 138 of the strap member 134 into the blade hole 114. The installation process 900 continues (step 904) by inserting the upper bushing 148 and the lower bushing 150 into the blade hole 114. As a result, the distal end receiving portion 138 is disposed between and supported by the upper bushing 148 and the lower bushing 150.

The installation process 900 continues (step 906) by inserting the outboard blade pin 158 into the bushing inner cavity 152 and through the distal end receiving portion 138. As a result, the distal end receiving portion 138 surrounds the blade pin body portion 160 of the outboard blade pin 158 and the base portion 166 is disposed within the lower counterbored portion 156.

The installation process 900 continues (step 908) by inserting the first fastener 168 into the upper counterbored portion 154. As a result, the lower portion 172 of the first fastener 168 is disposed within the blade pin inner cavity 162, and the top portion 164 of the outboard blade pin 158 is disposed between the lower portion 172 and the upper bushing 148. Further, the cap portion 170 is disposed above the upper bushing 148.

The installation process 900 continues (step 910) by inserting the second fastener 176 into the blade pin inner cavity 162 and the first fastener 168 such as to compress the upper bushing 148 and reduce a gap between the upper bushing 148 and the distal end receiving portion 138.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

What is claimed is:

1. A rotor blade retention assembly comprising:
   a central hub,
   a rotor blade comprising an upper outer surface, a lower outer surface, a blade hole, and a proximal end coupled to the central hub;
   a strap member extending along a portion of the rotor blade such that a distal end receiving portion of the strap member extends into the blade hole; and
   a retainer assembly disposed within the blade hole and coupled to the strap member, the retainer assembly comprising:
      an upper bushing slidably disposed within the blade hole and extending between the strap member and the upper outer surface of the rotor blade, the upper bushing comprising an upper counterbored portion,
      a lower bushing slidably disposed within the blade hole and extending between the strap member and the lower outer surface of the rotor blade,
      an outboard blade pin disposed within the distal end receiving portion of the strap member, the outboard blade pin comprising a blade pin inner cavity,
      a first fastener disposed within the upper counterbored portion, and
      a second fastener extending through the blade pin inner cavity and coupled to the first fastener such that the first fastener, the outboard blade pin, and the second fastener cooperatively clamp the lower bushing and the upper bushing to the strap member.

2. The rotor blade retention assembly of claim 1, further comprising a protective layer disposed within the blade hole,
   where a first portion of the protective layer is disposed between an inner wall of the blade hole and the upper bushing and extends from the strap member to the upper outer surface, and
   wherein a second portion of the protective layer is disposed between the inner wall of the blade hole and the lower bushing and extends from the strap member to the lower outer surface.

3. The rotor blade retention assembly of claim 1, wherein the first fastener comprises:
   a cap portion,
   a lower portion, and
   a fastener cavity extending through the cap portion and the lower portion.

4. The rotor blade retention assembly of claim 3, wherein the second fastener is a threaded fastener extending into the fastener cavity and threadedly coupled to the lower portion of the first fastener.

5. The rotor blade retention assembly of claim 4, wherein:
the receiving portion further comprises an inner mating component surface, and
the cap portion is configured to compress the upper bushing via the second fastener such that the upper bushing clamps the inner mating component surface and reduces a gap between the upper bushing and the inner mating component surface.

6. The rotor blade retention assembly of claim 3, wherein the first fastener is disposed within the upper counterbored portion such that the cap portion remains below the upper outer surface of the rotor blade.

7. The rotor blade retention assembly of claim 3, wherein a top portion of the outboard blade pin is disposed between the lower portion of the first fastener and the upper bushing.

8. The rotor blade retention assembly of claim 1, wherein:
the rotor blade further comprises a blade inner cavity that extends along an interior of the rotor blade, and
the strap member is disposed within the blade inner cavity.

9. The rotor blade retention assembly of claim 1, wherein the retainer assembly transfers a load from the retainer assembly to the strap member.

10. A retainer assembly for use in a rotor blade retention assembly having a retainer cavity, the retainer assembly comprising:
an upper bushing slidably disposed within the retainer cavity, the upper bushing comprising an upper counterbored portion;
a lower bushing slidably disposed within the retainer cavity, the upper bushing and the lower bushing cooperating to define a bushing inner cavity;
an outboard blade pin disposed within the bushing inner cavity, the outboard blade pin comprising a blade pin inner cavity;
a first fastener disposed within the upper counterbored portion; and
a second fastener extending through the blade pin inner cavity and coupled to the first fastener such that the first fastener, the outboard blade pin, and the second fastener are configured to cooperatively clamp the lower bushing and the upper bushing to a spool disposed therebetween.

11. The retainer assembly of claim 10, wherein the first fastener comprises:
a cap portion,
a lower portion, and
a fastener cavity extending through the cap portion and the lower portion.

12. The retainer assembly of claim 11, wherein the first fastener is disposed within the upper counterbored portion such that the cap portion is disposed entirely within the retainer cavity.

13. The retainer assembly of claim 11, wherein the second fastener is a threaded fastener extending into the fastener cavity and threadedly coupled to the lower portion of the first fastener.

14. The retainer assembly of claim 13, wherein a top portion of the outboard blade pin is disposed between the upper bushing and the lower portion of the first fastener.

15. The retainer assembly of claim 14, wherein the upper bushing and the lower bushing are configured to be clamped to the spool with the spool surrounding a blade pin body portion of the outboard blade pin.

16. The retainer assembly of claim 15, wherein the cap portion is configured to compress the upper bushing via the second fastener such that the upper bushing clamps the spool and reduces a gap between the upper bushing and the spool.

17. The retainer assembly of claim 11, wherein a diameter of the cap portion is greater than a diameter of the lower portion.

18. The retainer assembly of claim 10, wherein:
the lower bushing comprises a lower counterbored portion,
the outboard blade pin comprises a base portion, and
wherein the base portion is disposed within the lower counterbored portion.

19. A method for installing a retainer assembly of a rotor blade retention assembly having a central hub, a rotor blade having a blade hole, a blade inner cavity and a proximal end coupled to the central hub, and a strap member disposed within the blade inner cavity and including a distal end receiving portion, the retainer assembly having an upper bushing with an upper counterbored portion, a lower bushing, and a bushing inner cavity, a first fastener, a second fastener, and an outboard blade pin including a blade pin inner cavity, the method comprising:
inserting the distal end receiving portion of the strap member into the blade hole,
inserting, after inserting the distal end receiving portion of the strap member into the blade hole, the upper bushing and the lower bushing into the blade hole;
inserting, after inserting the upper bushing and the lower bushing into the blade hole, the outboard blade pin into the bushing inner cavity and through the distal end receiving portion;
inserting the first fastener into the upper counterbored portion of the upper bushing;
inserting the second fastener through the blade pin inner cavity; and
coupling the first fastener to the second fastener such that the first fastener, the outboard blade pin, and the second fastener cooperatively clamp the lower bushing and the upper bushing to the strap member.

20. A rotor blade retention assembly comprising:
a central hub,
a rotor blade comprising an upper outer surface, a lower outer surface, a blade hole, and a proximal end coupled to the central hub;
a strap member extending along a portion of the rotor blade such that a distal end receiving portion of the strap member extends into the blade hole;
a retainer assembly disposed within the blade hole and coupled to the strap member, the retainer assembly comprising:
an upper bushing slidably disposed within the blade hole and extending between the strap member and the upper outer surface of the rotor blade, the upper bushing comprising an upper counterbored portion,
a lower bushing slidably disposed within the blade hole and extending between the strap member and the lower outer surface of the rotor blade, the upper bushing and the lower bushing cooperating to define a bushing inner cavity,
an outboard blade pin disposed within the distal end receiving portion of the strap member, the outboard blade pin comprising a blade pin inner cavity, and
a protective layer disposed within the blade hole, wherein a first portion of the protective layer is disposed between an inner wall of the blade hole and the upper bushing and extends from the strap member to the upper outer surface, and wherein a second portion of the protective layer is disposed between the inner wall of the blade hole and the lower bushing and extends from the strap member to the lower outer surface.

* * * * *